June 25, 1946. U. LAMM Re 22,768

DIRECT CURRENT SATURATED INDUCTANCE WITH RELAY ACTION

Original Filed March 7, 1940

Inventor.
UNO LAMM.
per Wm. Wallace White.
Attorney.

Reissued June 25, 1946 Re. 22,768

UNITED STATES PATENT OFFICE 22,768

DIRECT CURRENT SATURATED INDUCTANCE WITH RELAY ACTION

Uno Lamm, Ludvika, Sweden, assignor to Allmänna Svenska Elektriska Aktiebolaget, Vasteras, Sweden, a corporation of Sweden Original No. 2,337,253, dated December 21, 1943, Serial No. 322,750, March 7, 1940. Application for reissue January 6, 1945, Serial No. 571,622

10 Claims. (Cl. 171—242)

This invention relates to a direct current saturated inductance of the type having a relay action.

It is already known that such inductances may be delayed in their action by connecting the direct current saturating winding in parallel with a condenser. According to the present invention, such time delay means is combined with a direct current saturating winding connected in a circuit fed through a rectifier by the alternating current traversing said inductance coil. The time delay means may be connected in an independent direct current circuit influencing the inductance coil or in the second circuit fed by said coil through the rectifier. In any of these cases, a certain time delay can be obtained by much smaller delaying means, for instance, a smaller condenser, than by the known connection.

Some forms of the invention are diagrammatically illustrated in Figs. 1–4 of the accompanying drawing.

Figure 1:
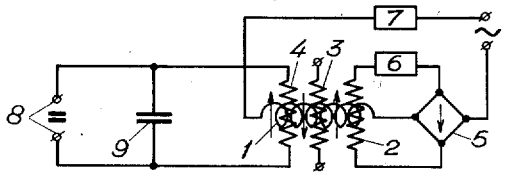

In Fig. 1, 1 is the alternating current winding of the direct current saturated inductance and 2, 3, 4 three direct current windings acting thereon. The winding 2 is self-fed over a rectifier 5 in series with the load, which may be on the direct current side at 6 or on the alternating current side at 7. The winding 3, which counter-acts the winding 2, is fed from an independent source and serves mainly to restore the original state after a high excitation of the inductance. The winding 4, which acts in the same sense as the winding 2, serves to provoke the high excitation, corresponding to the closing of the contacts of a relay.

The relay is for instance intended to respond to a certain overload in a circuit which comprises the terminals 8. The normal current in this circuit does not provoke any appreciable increase in the excitation of the inductance. To introduce a time delay in the action of the overload current, a condenser 9 is, in this form, connected in parallel to the winding 4. When the normal current is exceeded, the excess first passes mainly through the condenser, and only after a certain time, depending on the value of the excess and the capacity of the condenser, the current in the winding 4 rises so far that the inductance becomes highly excited.

As the winding 4 mainly acts as an inductance with respect to the direct current circuit, it may, for small values of the desired time delay, be sufficient to introduce an ohmic resistance instead of a condenser, said resistance being less time-dependent than the inductance formed by the winding. If the terminals 8 are subjected to a voltage varying in a certain manner instead of to a varying current, there should be connected between them and the condenser 9 or its substitute an inductance or an ohmic resistance for making the current between the terminals comparatively independent of the conditions to the right of the condenser branch.

Figure 2:
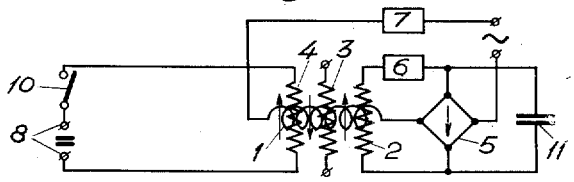

In Fig. 2, the parts of the direct current saturated inductance and the load objects are designated in the same manner as in Fig. 1. The winding 4 is here connected to direct current terminals 8 through a contact 10 without any time delay element, but in parallel to the self-fed winding 2 lies a condenser 11 which prevents the self exciting direct current from rising as rapidly as the traversing alternating current. As the latter is in its turn dependent on the former, it is also in such cases, in which the action is, in a known manner, stable only at very high and very low, but not at intermediary values, prevented from passing instantaneously from a low to a high value, but such a passage takes place with a certain delay depending on the size of the condenser. If the characteristic of the direct current saturated inductance is such that it has also stable intermediary current values, it is at any rate prevented from passing through these too rapidly, if the current in the winding 4 is varied too rapidly. This connection is therefore suitable for motor starters by which it is intended to produce a slow rise of current or voltage. Here also the condenser 11 may be replaced by an ohmic resistance if a very large time delay is not required.

Figure 3:
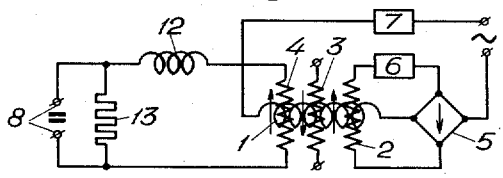

Fig. 3 differs from Fig. 1 only in that an inductance 12 is connected in series with the winding 4 and an ohmic resistance 13 in parallel to both, instead of a condenser being connected in parallel. The result will obviously be analogous to that obtained in Fig. 1.

Instead of impedances the time dependence of which is of a pure electric character, as capacities or inductances, such impedances may be introduced the time dependence of which is based on thermal conditions. Thus for instance the condenser 9 in Fig. 1 may be replaced by a resistance having a higher temperature coefficient than the winding 4 so as to absorb, in the case of an overload current, first a larger and then successively a smaller and smaller portion of the current. Hereby a larger time delay can be obtained than by means of a condenser. In the same manner, the inductance 12 in Fig. 3 may be replaced by a resistance having a negative temperature coefficient.

Figure 4:
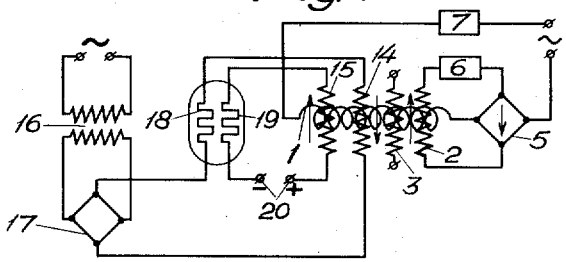

When thermally time-dependent impedances are used, it is not always necessary that the current producing the rise of temperature is the same as that traversing the magnetizing winding of the direct current saturated impedance. Instead of that, two currents may be superimposed on each other in the same resistance or two resistances may be placed in a good heat transferring relation to one another, one of said resistances being traversed by the current to which the inductance is intended to be responsive, and thereby heats the other which is traversed by the magnetizing current. It is also possible to cause two resistances, thermally influencing each other, to be traversed by separate magnetizing currents, whereby a peculiar time characteristic of the direct current saturated inductance may be obtained. An example of this is shown in Fig. 4. The inductance 1 has in this example four direct current windings 2, 3, 14, 15, the two first enumerated of which are fed exactly in the same way as in Figs. 1–3. The winding 14 is fed for instance by a current proportional to the load current in a line, being obtained from a current transformer 16 and a rectifier 17 and traversing a resistance 18. In close heat transferring relation to the resistance 18 there is a resistance 19 with a negative temperature coefficient, consisting for instance of uranium oxide, connected in series with the winding 15 to a constant voltage on the terminals 20. This last-mentioned winding acts in a positive sense on the inductance, while the winding 14 may act in a positive or in a negative sense, depending on the action intended. If it is caused to act in a positive sense, the same action may be obtained at the inductance as in an overload inverse time limit relay with instantaneous release in the case of a short-circuit. The windings 14 and 15 are then so dimensioned, that a moderate over-current in 14 together with the current in 15 obtained at ordinary temperature of the resistance 19 is not sufficient to excite the inductance to a high current. On the other hand, a stronger over-current in the winding 14, corresponding to a short-circuit, causes a high excitation of the inductance instantaneously. A moderate over-current in the circuit containing the winding 14, which lasts for some time, heats the resistance 18 and thereby also the resistance 19 so much—in a time which is reduced at an increase of the current—as to lower its value and to increase the current through the winding 15 so much as to cause a high excitation of the inductance.

If, on the contrary, the winding 14 is made to act in a negative sense, a blocking action can be obtained at instantaneous strong over-currents, as is for instance desirable in operating circuit breakers which are not capable of breaking a short-circuit at the first instant but after the short-circuit current has fallen to its stationary value. The blocking action may for instance be obtained by making the counter-excitation by the winding 14, for an over-current beyond control of the circuit-breaker, sufficiently strong for preventing a high excitation under any conditions, even if the current in the winding 15 should reach its full value by the heating of the resistances.

I claim as my invention:

1. In a device of the type described, an iron core inductance coil having an alternating current winding and a plurality of direct current winding means, a source of direct current connected to one of said direct current winding means so as to operate thereon in one direction, another of said direct current winding means being connected with said alternating current winding through a rectifier so as to operate in the opposite direction, a source of alternating current independent of the above-named current source and feeding said alternating current winding, a load connected in series with said alternating current winding, a control source of direct current connected to a third of said direct current winding means independent of the other direct current winding means so as to operate thereon in said opposite direction, and time delay means connected between the last-mentioned source and the direct current winding means to which said source is connected.

2. In a device of the type described, an iron core inductance coil having an alternating current winding and a plurality of direct current winding means, a source of alternating current feeding said alternating current winding, rectifying means connected to said alternating current and direct current winding means so as to magnetize said core in one direction with direct current substantially proportional to the alternating current flowing from said alternating current source through said alternating current winding, a load connected in series with said alternating current winding, a control source of direct current connected to certain other of said direct current winding means, and time delay means connected between said last-mentioned source and the direct current winding means to which said source is connected.

3. In a device of the type described, an iron core inductance coil having an alternating current winding and a plurality of direct current winding means, one of said direct current winding means being connected with said alternating current winding through a rectifier, a source of alternating current feeding said alternating current winding, a load connected in series with said alternating current winding, a control source of direct current connected to another of said direct current winding means, and time delay means connected between the last-mentioned source and the direct current winding means to which said source is connected.

4. In a device of the type described, an iron core inductance coil having an alternating current winding and a plurality of direct current winding means, one of said direct current winding means being connected with said alternating current winding through a rectifier so as to operate in one direction, a source of alternating current feeding said alternating current winding, a load connected in series with said alternating current winding, a control source of direct current connected to another of said direct current winding means so as to cause it to operate in the same direction as that fed over said rectifier, and time delay means connected between the last-mentioned source and the direct current winding means to which said source is connected.

5. In a device of the type described, an iron core inductance coil having an alternating current winding and three direct current windings, a source of direct current connected to one of said windings so as to operate thereon in one direction, a rectifier having alternating current input terminals and direct current output terminals, circuit means connecting another of said windings across said direct current output terminals, a source of alternating current independent of said source of direct current and having two sides, circuit means respectively connecting the sides of said source of alternating current to the alternating current input terminals of said rectifier, one of said circuit means including a load, said alternating current winding being in the circuit means between one of the sides of the source of alternating current and the alternating current terminal of said rectifier connected thereto, a control source of direct current independent of the above-named current sources connected independently of said alternating current source to the other of said other direct current windings so as to operate thereon in the direction opposite to the first-named direction, and direct current time-delay means connected with at least one of said other direct current windings.

6. In a device of the type described, an iron core inductance coil having an alternating current winding and a plurality of direct current winding means, an independent source of direct current connected to one of said direct current winding means so as to operate thereon in one direction, a rectifier having alternating current input terminals and direct current output terminals, circuit means connecting the direct current output terminals to another of said direct current winding means so as to operate thereon in the opposite direction, a source of alternating current having two sides, circuit means respectively connecting the sides of the source of alternating current to the alternating current input terminals of said rectifier, one of said circuit means including a load, said alternating current winding being in the circuit means between one of the sides of the source of alternating current and the alternating current input terminal of said rectifier connected thereto, a control source of direct current connected to a third of said direct current winding means independent of the other direct current winding means so as to operate thereon in said opposite direction, and time-delay means connected between the last-mentioned source and the direct current winding means to which said source is connected.

7. In a device of the type described, an iron core inductance coil having an alternating current winding and a plurality of direct current winding means, a source of direct current connected to one of said direct current winding means so as to operate thereon in one direction, a rectifier having alternating current input terminals and direct current output terminals, circuit means connecting the direct current output terminals to a second of said direct current winding means so as to operate thereon in the opposite direction, a source of alternating current having two sides, circuit means respectively connecting the sides of the source of alternating current to the alternating current input terminals of said rectifier, one of said circuit means including a load, said alternating current winding being in the circuit means between one of the sides of the source of alternating current and the alternating current input terminal of said rectifier connected thereto, a control source of direct current connected to a third of said direct current winding means so as to operate thereon in said opposite direction, and direct current time-delay means connected between the last-mentioned source and the direct current winding means to which said source is connected, said direct current time-delay means comprising a condenser connected in parallel with said third direct current winding means.

8. In a device of the type described, an iron core inductance coil having an alternating current winding and a plurality of direct current winding means, a source of direct current connected to one of said direct current winding means so as to operate thereon in one direction, a rectifier having alternating current input terminals and direct current output terminals, circuit means connecting the direct current output terminals to a second of said direct current winding means so as to operate thereon in the opposite direction, a source of alternating current having two sides, circuit means respectively connecting the sides of said source of alternating current to the alternating current input terminals of said rectifier, one of said circuit means including a load, said alternating current winding being in the circuit means between one of the sides of said source of alternating current and the alternating current input terminal of said rectifier connected thereto, a control source of direct current connected to a third of said direct current winding means so as to operate thereon in said opposite direction, and direct current time-delay means connected between the last-mentioned source and the direct current winding means to which said source is connected, said direct current time-delay means comprising an ohmic resistance connected in parallel with said third direct current winding means and an inductance connected in series between one side of said ohmic resistance and one side of the last-mentioned winding means.

9. In a device of the type described, an iron core inductance coil having an alternating current winding and a plurality of direct current winding means, a source of alternating current feeding said alternating current winding, rectifying means connected to said alternating current winding and one of said direct current winding means so as to magnetize said core in one direction with direct current substantially proportional to the alternating current flowing from said alternating current source through said alternating current winding, a load connected in series with said alternating current winding, a control source of direct current connected to certain other of said direct current winding means, and direct current time-delay means connected between the last-mentioned source and the direct current winding means to which said source is connected, said direct current time-delay means comprising a condenser connected in parallel with said other direct current winding means.

10. In a device of the type described, an iron core inductance coil having an alternating current winding and direct current winding means, a source of alternating current feeding said alternating current winding, rectifying means connected to said alternating current and direct current winding means so as to magnetize said core in one direction with a direct current substantially proportional to the alternating current flowing from said alternating current source through said alternating current winding, a load connected in series with said alternating current winding, a control source of direct current connected to certain of said direct current winding means, and time-delay means connected between the last-mentioned source and the direct current winding means to which said source is connected, said time-delay means comprising an ohmic resistance connected in parallel with said certain direct current winding means, and an inductance connected in series between one side of said ohmic resistace and one side of the last-mentioned winding means.

UNO LAMM.